US007953628B2

(12) United States Patent
Bordier (10) Patent No.: US 7,953,628 B2
(45) Date of Patent: May 31, 2011

(54) INTERACTIVE VOTER CHOICE SYSTEM (76) Inventor: Nancy Bordier, Washington, DC (US)

( * ) Notice: Subject to any disclaimer, the term of this patent is extended or adjusted under 35 U.S.C. 154(b) by 665 days.

(21) Appl. No.: 11/844,994

(22) Filed: Aug. 24, 2007

(65) Prior Publication Data
US 2008/0048032 A1 Feb. 28, 2008

Related U.S. Application Data (60) Provisional application No. 60/839,876, filed on Aug. 24, 2006.

(51) Int. Cl.
G06Q 99/00 (2006.01)
(52) U.S. Cl. ......... 705/12; 705/1.1; 705/7.11; 705/7.12; 705/7.29; 705/7.32; 235/386; 709/203; 706/13; 707/104.1
(58) Field of Classification Search ............ 705/12, 705/1.1, 7.11, 7.12, 7.29, 7.32; 255/386; 709/203; 706/13; 707/104.1
See application file for complete search history.

(56) References Cited

U.S. PATENT DOCUMENTS

| 5,400,248 | A | | 3/1995 | Chisholm | |
|---|---|---|---|---|---|
| 5,875,432 | A | * | 2/1999 | Sehr | 705/12 |
| 7,533,097 | B2 | * | 5/2009 | Ayediran et al. | 1/1 |
| 7,665,662 | B2 | * | 2/2010 | Faulk | 235/386 |
| 2007/0023515 | A1 | * | 2/2007 | Urken | 235/386 |
| 2007/0244749 | A1 | * | 10/2007 | Speiser et al. | 705/14 |

OTHER PUBLICATIONS

Arvai et al., "Testing Alernative Decision Approacehs for Identifying Cleanup Priorities at Contaminated Sites", 2003, American Chemical Society, vol. 37, No. 8.*
Pew Research Center, "Trends in Political Values and Core Attitudes: 1987-2007", Section 6: Government, Trust and Political Participation, Mar. 22, 2007, p. 45. Washington, D.C., United States of America. http://people-press.org/reports/display.php3?ReportID=312.
Pew Research Center, "Trends in Political Values and Core Attitudes: 1987-2007" Section 6: Government, Trust and Political Participation, Mar. 22, 2007, p. 46. Washington, D.C., United States of America. http://people-press.org/reports/display.php3?ReportID=312.
Thomas E. Mann "Redistricting Reform", The National Voter, published by the League of Women Voters, Jun. 2005, p. 4, Washington, D.C. United States of America. http://www.lwv.org/AM/Template.cfm?Section=Redistricting&Template=/TaggedPage/TaggedPageDisplay.cfm&TPLID=22&ContentID=7996.

* cited by examiner

Primary Examiner — Jalatee Worjloh (57) ABSTRACT

An interactive voter choice system providing voters mechanisms they can use to play more pro-active roles in influencing elections and policy-making by elected representatives in representative bodies than the relatively passive roles ascribed to them in the typical rules and regulations governing these elections, namely mechanisms that enable them to specify in written policy agendas their preferred policy options chosen from a comprehensive database of policy options, transmit their agendas to provide information and instructions to candidates for office, elected representatives and others; request candidates and representatives to use the comprehensive database to specify their preferred policy options in written agendas; and use voters' own agendas to build consensus, coalitions and voting blocs that can run and elect their own candidates for office and induce elected representatives to enact their agendas.

12 Claims, 7 Drawing Sheets

Step 1. Creation of a comprehensive database of $n_1$ objects, preferably computerized and located on a website accessible via the internet.

Step 2. The voter, preferably with a personal computer and internet access to a website, periodically accesses the database of $n_1$ objects to create written policy agendas comprised of $n_2$ objects representing policy options chosen from the database of $n_1$ objects, preferably rank ordered to indicate his priorities from most to least preferred.

Step 3. The voter periodically transmits to the database of $n_3$ subsets of $n_2$ objects (which is used for polls and coalition-building) his policy agenda comprised of a subset of $n_2$ objects chosen from the database of $n_1$ objects, preferably ranked ordered.

Step 4. The voter transmitting policy agendas to the database of $n_3$ subsets of $n_2$ objects provides the following information: his email address, geographical indicator of place of residence (e.g. ZIP code or electoral district), demographic information and indication of interest in building coalitions and voting blocs.

Step 5. The voter is assigned a unique alphanumeric indicator attached to his personal information and subsets of m objects, as well as an internal email address and mailbox on the website.

Step 6. The voter views periodic polls displaying statistics drawn from the polling database of m subsets of n objects comprising the preferred policy options that voters periodically choose from the database of n objects.

FIG. 3

| KEY TO MSM 1 | | | |
|---|---|---|---|
| ◆ LIVELIHOODS | ◈ HEALTH & WELFARE | ✤ SECURITY | ◉ CIVIL & POLITICAL RIGHTS |
| Jobs, Tax Cuts & the Economy | Affordable Health Care | "War on Terror" (Pro) | Campaign Finance Reform (Pro) |
| Job Availability | Health Savings Accounts | "War on Terror" (Con) | Campaign Finance Reform (Con) |
| Minimum Wage | Social Security | Global Epidemics/Natural Disasters | Press, Speech & Assembly |
| Competitiveness & Outsourcing | Medicare | Crime Reduction | Electronic Surveillance |
| Gas & Home Heating Prices | Entitlements | Gun Control (Pro) | Internet Access & Digital Rights |
| Jobs & Trade Protection | Social Safety Net for the Poor | Gun Control (Con) | Patriot Act (Pro) |
| Rugged Individualism (Pro) | Abortion Rights (Pro) | Death Penalty (Pro) | Patriot Act (Con) |
| Rugged Individualism (Con) | Abortion Rights (Con) | Death Penalty (Con) | Electronic Voting |
| Affordable Retirement | Higher Education Loans | Global Warming/Kyoto Treaty | Discrimination |
| Interest Rates | Medical Liability Reform | Detention & Rendition (Pro) | Immigrant Rights (Pro) |
| Trade Unions (Pro) | HMOs | Detention & Rendition (Con) | Immigrant Rights (Con) |
| Trade Unions (Con) | Stem Cell Research (Pro) | Military Force (Pro) | Cruel/Inhuman Treatment (Pro) |
| Affordable Housing | Stem Cell Research (Con) | Military Force (Con) | Cruel/Inhuman Treatment (Con) |

FIG. 4

| SAY TO WHAT? | ❖ ECONOMY | ❖ LOCAL/STATE GOVERNMENT | ❖ FEDERAL GOVERNMENT | ❖ INTERNATIONAL RELATIONS |
|---|---|---|---|---|
| | Investment Tax Cuts | Property Tax | Executive Power | Weapons of Mass Destruction |
| | Excess Profits Taxes | Sales Tax | Checks and Balances | Wealth Gap, Poverty & Terrorism |
| | Free Enterprise/Entrepreneurship | Corporate Tax | Federal Debt and Budget Deficit | Islamic Radicalism |
| | Economic Globalization (Pro) | Income Tax | Tax Burden (Middle Class) | Geneva Convention (Pro) |
| | Economic Globalization (Con) | Public School Alternatives | Tax Burden (Wealthy) | Geneva Convention (Con) |
| | Green Economy/Renewable Energy | School Finance | Electoral College (Pro) | World Bank (Pro) |
| | Privatization of the Commons (Pro) | Gay Marriage (Pro) | Electoral College (Con) | World Bank (Con) |
| | Privatization of the Commons (Con) | Gay Marriage (Con) | Foreign Policy Israel/Palestine (Pro) | Development & Microfinance |
| | Trade Deficit | Social Enterprise Investment | Foreign Policy Israel/Palestine (Con) | WTO (Pro) |
| | Government Regulation (Pro) | National Guard & First Responders | Foreign Policy Iraq (Pro) | WTO (Con) |
| | Government Regulation (Con) | Eminent Domain | Foreign Policy Iraq (Con) | UN & Peacekeeping (Pro) |
| | Local Living Economies (Pro) | Redistricting | Foreign Aid (Pro) | UN & Peacekeeping (Con) |
| | Local Living Economies (Con) | State-Mandated Insurance & Pensions | Foreign Aid (Con) | U.S. & Global Resources |

FIG. 5

♠ LIVELIHOODS   ● HEALTH & WELFARE   ✴ SECURITY   ♦ CIVIL & POLITICAL RIGHTS

A ♠ LIVELIHOODS
Jobs, Tax Cuts & the Economy

The best way to create jobs is to keep the economy growing by cutting taxes so that Americans have more of their own money to spend, save, and invest in businesses that create jobs. According to the President's 2006 State of the Union Address, tax relief in this decade has left $880 billion in the hands of American workers, investors, small businesses and families. It has contributed to more than four years of uninterrupted economic growth and the creation of 4.6 million jobs in the past two years, more than the European Union and Japan combined.

Links

A ● HEALTH & WELFARE
Affordable Health Care

All Americans should have affordable health care. No one should be bankrupted by the costs of medical care or catastrophic illness. The original idea of insurance is to spread out the risk among many people. Allowing private insurers to limit their risks to pools of people whose premiums exceed the cost of their claims has left 47 million Americans uninsured. We need a single-payer, government-financed, universal health care system that holds the private sector accountable for providing cost-effective, high quality health care.

Links

A ✴ SECURITY
"War on Terror" (Pro)

The attacks of 9/11 demonstrated that the single most important threat to our security is terrorism. President Bush showed strong leadership in declaring a "war on terrorism" after 9/11 and launching a military counter-offensive in Afghanistan. He is correct that we should rely on the use of military force and other means to "kill or capture the terrorists, deny them safe haven or control of any nation, prevent them from gaining access to weapons of mass destruction (WMD), and cut off their sources of support".

Links

A ♦ CIVIL & POLITICAL RIGHTS
Campaign Finance Reform (Pro)

Our voting rights are meaningless when elected representatives receive more than 90% of their campaign contributions from special interests and wealthy contributors who pressure them to pass legislation that is in their interest. Research shows that donations and lobbying campaigns can determine what legislation gets passed or shut down. We can stop special interests from controlling our government if we permit only individual citizens to make political contributions, publicly-fund campaigns and provide free air-time.

Links

2 ♠ LIVELIHOODS
Job Availability

Although the President boasts that 4.6 million jobs have been created since 2004, a normal, healthy economy would have created 4.6 million jobs in 2005 alone without recent tax cuts. The fact is that 2.6 million manufacturing jobs have been lost since 2000, largely due to outsourcing. Workers are left with low-paying service jobs and stagnant wages and real income that do not cover their needs for food, shelter and medical care. The public and private sector must join forces to create an economy that provides jobs and living wages for all.

Links

2 ● HEALTH & WELFARE
Health Savings Accounts

Health Savings Accounts (HSAs) use market forces to reduce spiraling medical costs. People will own and be financially responsible for their own health care costs, instead of passing them on to a third-party provider. HSAs enable individuals and small businesses to go into the marketplace to buy high-deductible insurance, which is less costly than traditional insurance plans. They can then create tax-free savings accounts (HSAs) to use for medical expenses up to the present deductible amount of their insurance.

Links

2 ✴ SECURITY
"War on Terror" (Con)

Terrorist attacks against unarmed civilians is a tactic often used by people with grievances they have been unable to resolve any other way. Middle East terrorists tend to belong to groups that have been economically and politically disenfranchised by brutal governments. U.S. military attacks makes Americans less safe because it increases the number of people with grievances, and worsens attacks. All nations should join forces to bring terrorism under control through coordinated, global policing operations.

Links

2 ♦ CIVIL & POLITICAL RIGHTS
Campaign Finance Reform (Con)

Laws passed to reform campaign financing infringe Americans' Constitutional rights. They violate the First Amendment by restricting free speech and create Political Action Committees that weaken political parties. PACs provide special interest groups extra channels to influence elections. All laws and restrictions on free speech and political contributions should be repealed. The sources of all donations, however, must be reported immediately to have transparency, open debate and free speech.

Links

FIG. 6

Protecting livelihoods
*Citizens' Winning Hands*™
Restoring popular sovereignty in America

Jobs, Tax Cuts & the Economy

Links

1. David Brooks, A Reality-Based Economy, International Herald Tribune, July 24, 2007.
2. U.S. President George W. Bush, 2006 State of the Union Address.
3. Republican National Committee, Jobs & Economy.
4. Kevin A. Hassett, Let's Cut Corporate Taxes to Create More Jobs, American Enterprise Institute and Bloomberg, January 9, 2006.
5. Rea S. Hederman, Jr., and William W. Beach, Make the Dividend and Capital Gains Tax Rates Permanent to Keep the Economy Growing, The Heritage Foundation, February 16, 2006.

Return

Copyright © 2007 Citizens' Winning Hands

FIG. 7

Protecting livelihoods
*Citizens' Winning Hands℠*
Restoring popular sovereignty in America

Job Availability

Links

1. E. J. Dionne, In Search Of a New New Deal: How Will the Good Jobs Of the Future Be Created?, Washington Post, June 13, 2006.

2. L. Josh Bivens, Trade deficits and manufacturing job loss: Correlation and causality, Economic Policy Institute, March 14, 2006.

3. Center for American Progress, Bush's Tax and Budget Policies Fail to Promote Economic Growth, February 16, 2006.

4. Center for American Progress, State of the Economy, January 26, 2006.

5. ACORN, Living Wage Resource Center.

6. Progressive States Network, Economic Growth.

7. International Labor Organization, Job Creation and Enterprise Development.

Return

Copyright © 2007 Citizens' Winning Hands

INTERACTIVE VOTER CHOICE SYSTEM

CROSS-REFERENCE TO RELATED APPLICATIONS

This application claims the benefit of U.S. Provisional Application No. 60/839,876, filed Aug. 24, 2006.

BACKGROUND OF THE INVENTION (1) Field of the Invention

The present invention is generally related to the field of elections in which voters elect representatives to make decisions on their behalf in representative bodies in governments, business enterprises, institutions, associations, labor unions, political parties, advocacy groups, nonprofits and other groups and organizations.

More specifically, the invention is directed to interactive voter choice systems and methods facilitating voters to play more interactive roles in elections.

(2) Description of the Related Art

Although elections to representative bodies are portrayed as enabling voters to elect representatives who make decisions on their behalf once the representatives are in office, typically it is not the voters who put these representatives on the ballot as candidates to represent them. Candidates are typically placed on the ballot by nominating bodies rather than the voters. In other instances, candidates put themselves on the ballot.

Moreover, election rules and procedures typically do not comprise mechanisms enabling voters to specify in written policy agendas their preferred policy options, chosen from a comprehensive database of policy options, to serve as a guide to nominating bodies selecting the candidates or to individuals who place themselves on the ballot. Once voters are presented with a slate of candidates whose names already appear on the ballot, the lack of mechanisms to create written policy agendas from comprehensive databases of options impedes voters from providing information and instructions to candidates for office regarding the policies the voters want them to enact if they are elected.

The absence of such mechanisms also prevents voters from requesting candidates for office and elected representatives to provide them with written policy agendas comprised of policy options chosen from the same comprehensive database of options from which voters choose their preferences, which voters can then use to compare their respective agendas, evaluate candidates' platforms and hold elected representatives accountable for their performance in office.

Consequently, candidates tend to use vague language during their campaigns to describe their platforms and policy agendas. They typically cite a limited number of general policy objectives so as to avoid controversy, a practice which often hampers voters' efforts to discern what the candidate's positions are so they can decide whether they want to be represented by any of the candidates.

Likewise, elected representatives tend to use vague language to describe their policy agendas and provide their constituents little information about how they voted on specific legislation. As a result, voters often have to choose a candidate and platform from a slate of candidates that includes incumbent officeholders and first-time candidates about whom they know little. These slates of candidates and their platforms may be quite different from those the voters would prefer to see on the ballot.

Because of these practices and the lack of mechanisms available to voters and candidates to create written policy agendas, which voters can use to evaluate candidates and their platforms, there tends to be a "loose fit" between voters' policy agendas, the campaign platforms and policy agendas adopted by candidates for office and the policy agendas enacted by elected representatives once they are in office.

Research indicative of this discrepancy between voters' policy preferences and those of elected representatives in contemporary American government is provided by a recent Pew Research Center poll, which found that "Americans feel increasingly estranged from their government". A majority of Americans (52%) say that "government is not run for the benefit of all the people", according to a poll entitled, *Trends in Political Values and Core Attitudes:* 1987-2007, Section 6: Government, Trust and Political Participation, published by the Center in Washington, D. C., Mar. 22, 2007, pp. 5 and 46.

BRIEF SUMMARY OF THE INVENTION

The present invention is designed to assist voters alleviate the discrepancy between voters' policy preferences and those of elected representatives in contemporary American government. It provides voters mechanisms under their control for specifying in written policy agendas their preferred policy options that they choose from a comprehensive database of policy options to which they can add their own options. The voter can transmit his policy agenda to candidates for elective office and elected representatives to provide them information and instructions regarding the policy options the voter wants to see enacted into law.

The voter can also use these mechanisms to request candidates for office and elected representatives to create their own written policy agendas by selecting their preferred policy options from the comprehensive database and transmitting their agendas to the voter. The voter can then compare, contrast and evaluate their respective agendas and engage in dialogs with the candidates and representatives to build consensus about what policy options they share, and whether and how divergent preferences can be reconciled. Moreover, voters can also use their evaluations of the respective policy agendas to decide whether to vote for incumbent representatives who stand for re-election or other candidates on the ballot.

The present invention also provides mechanisms by which voters can identify and contact other voters whose policy agendas and preferred policy options chosen from the comprehensive database are statistically similar to their own, for the purpose of building coalitions and voting blocs that can place their own candidates on the ballot who advocate policy agendas similar to their own. Voters may find these mechanisms particularly useful in U.S. electoral districts in which voters' policy preferences diverge from those of the political parties that traditionally place candidates on the ballot.

BRIEF DESCRIPTION OF THE SEVERAL VIEWS OF THE DRAWING

The detailed description of the present invention is best understood when read in conjunction with the FIGURES below:

FIG. 5 provides a screenshot of the policy options provided by 6 objects from the comprehensive database presented visually as cards in decks of cards, per the prototype of the application of the invention to the U.S. government accessible via a computer network and/or website on the internet.

DETAILED DESCRIPTION OF THE INVENTION

The preferred embodiment of the invention is its application to popular elections to elective bodies in governments of nation states, such as the U.S., and legislative policy-making by elected representatives in these bodies.

The invention provides interactive voter choice mechanisms that voters can use to play more pro-active roles in influencing elections and policy-making by elected representatives in representative bodies in governments than the relatively passive roles ascribed to them in the typical rules and regulations governing these elections. These mechanisms enable them to specify in written policy agendas their preferred policy options chosen from a comprehensive database of policy options, transmit their agendas to provide information and instructions to candidates for office, elected representatives and others; request candidates and representatives to use the comprehensive database to specify their preferred policy options in written agendas; and use voters' agendas to build consensus, coalitions and/or voting blocs that can run and elect their own candidates for office and induce elected representatives to enact their agendas.

In general, and with respect to the U.S. government in particular, voters can use the invention's voter-controlled mechanisms independently of existing electoral laws and regulations governing the conduct of elections without changing them or awaiting completion of current reforms that are underway (e.g. redistricting of electoral districts, campaign finance reform, changes to the way the Electoral College functions, etc).

The U.S. Constitution and amendments and the laws and regulations of Congress and the fifty states provide the legal framework for the popular election of candidates to representative bodies in American government at local, state and federal levels.

The preamble to the U.S. Constitution specifies that the "people of the United States" established the U.S. Constitution, rather than the states. In a landmark decision of the U.S. Supreme Court in 1819, McCulloch v. Maryland, U.S. Chief Justice John Marshall affirmed that government "proceeds directly from the people" and that "in form and in substance it emanates from them". The U.S. Constitution and subsequent amendments and the laws and regulations of Congress and the 50 states established the right of all citizens to vote in governmental elections and specified the rules and regulations by which they elect their representatives.

Despite the fundamental role this legal framework grants to U.S. voters in electing their representatives, it is not the voters who actually select and place the candidates on the ballot from whom the voters must choose when they are deciding who they want to elect to represent them. Nor do voters typically play a decisive role in determining the platforms on which these candidates run. Moreover, the existing legal framework for elections in the U.S. does not provide voters or coalitions and voting blocs of voters the mechanisms provided by the present invention for creating policy agendas that enable them to build coalitions and/or voting blocs through which they can play pro-active roles in placing their own candidates on the ballot, determining the content of the platforms of their candidates for office, and holding their elected representatives accountable for the legislative policies they vote to enact while they are in office.

Lack of written policy agendas drawn from a comprehensive database of options and mechanisms like those offered by the present invention also hampers voters from providing policy-specific information and instructions to candidates for office they do not place on the ballot or to the nominating bodies that place these candidates on the ballot, such as those belonging to political parties, regarding the policies the voters want the candidates to vote to enact if they are elected.

Additionally, lack of such mechanisms prevents voters from requesting candidates and elected representatives to formulate written agendas of policy options chosen from the same comprehensive database from which voters chose their options so that the voters can compare and contrast their respective agendas, evaluate their positions when deciding who to vote for and hold representatives accountable for the policies they vote to enact or fail to vote to enact when they are in office.

As a result, the large majority of voters tend to be confined to a relatively reactive mode of voting for candidates whom they have not placed on the ballot and acquiescing in platforms that the candidates have formulated with scant input from voters.

Voters' choices and options are particularly likely to be narrowed in gerrymandered electoral districts where candidates backed by the dominant party enjoy electoral advantages over other candidates.

These are districts whose geographical boundaries have been redrawn to provide one political party with decisive electoral advantages. In gerrymandered districts, which include the vast majority of all U.S. electoral districts, the majority party is typically able to successfully run incumbents for re-election term after term without competitive races, often with campaign financing that comes from outside the district.

In 2004, for example, all but 36 of the 435 seats in the U.S. House of Representatives were considered non-competitive districts because they lacked viable electoral contests due to gerrymandered districts with artificially-created single-party majorities, according to the nonpartisan League of Women Voters. (See Thomas E. Mann, "Redistricting Reform", *The*

*National Voter*, published by the League of Women Voters, June 2005, page 4, Washington, D.C.

Not only do incumbents in gerrymandered electoral districts tend to get re-elected time after time in non-competitive races, but they also tend to finance their campaigns with campaign contributions received from individuals, special interest groups and business enterprises that are located outside the electoral district and are not entitled to vote.

Candidates for government office in most electoral districts in the U.S. are legally entitled to solicit and accept campaign contributions from individuals, special interest groups and business enterprises that are located outside their electoral districts even though these individuals, groups and enterprises are not entitled to vote for them.

Once these candidates are elected to office, they may be inclined to enact policies favored by their campaign contributors residing outside their electoral district rather than those favored by the voters who reside inside their electoral district.

As a result, in many typical elections, voters are faced with a "take it or leave it" choice of electing candidates whom they have had little or no influence in placing on the ballot, who are running their campaigns with funds from outside sources that are not entitled to vote for them, and who have formulated platforms with scant input from voters. These candidates and platforms may be quite different from the candidates (and the policy agendas that the voters would have preferred to see in their platforms) that the voters themselves and their own coalitions and voting blocs might have put on the ballot.

The lack of mechanisms such as those provided by the invention, which enable voters to create written policy agendas from a comprehensive database and use these agendas to build coalitions and/or voting blocs among people with similar agendas that select their own candidates for office and attune the policy agendas of the candidates to the agendas of the voters, has been found to result in a "loose fit" between voters' policy agendas and those of candidates, as well as between the agendas of voters and the agendas enacted by representatives who are elected to office.

Evidence of this loose fit as it affects constituents and elected representatives in American government is provided by a recent Pew Research Center poll, which found that barely a third (34%) of Americans agree with the following statement: "Most elected officials care what people like me think". (See *Trends in Political Values and Core Attitudes: 1987-2007, Section 6: Government, Trust and Political Participation*, published in Washington, D.C. by the League of Women Voters, March 22, 2007, pp. 45-6.)

The present invention addresses this loose fit between voters, on the one hand, and candidates for elective office and elected representatives, on the other hand. It provides voter-controlled interactive voter choice mechanisms focused around a comprehensive database of policy options and voter-created policy agendas of policy options chosen from the comprehensive database. Voters can use the mechanisms to attune the policy agendas of candidates for office and elected representatives to their own, build their own coalitions and voting blocs that can run their own candidates for office, as well as hold representatives accountable for the decisions they make in office. They can use the mechanisms to identify and contact other voters with similar policy agendas and preferred policy options chosen from the comprehensive database of options to build coalitions and voting blocs in their electoral districts that are comprised of a sufficient number of voters to run and elect their own candidates in primary and general elections against the candidates they oppose. (As used herein, a similar policy agenda or subset of $n_2$ objects preferably means statistically similar as determined by generally accepted statistical methods.)

Figure 1:
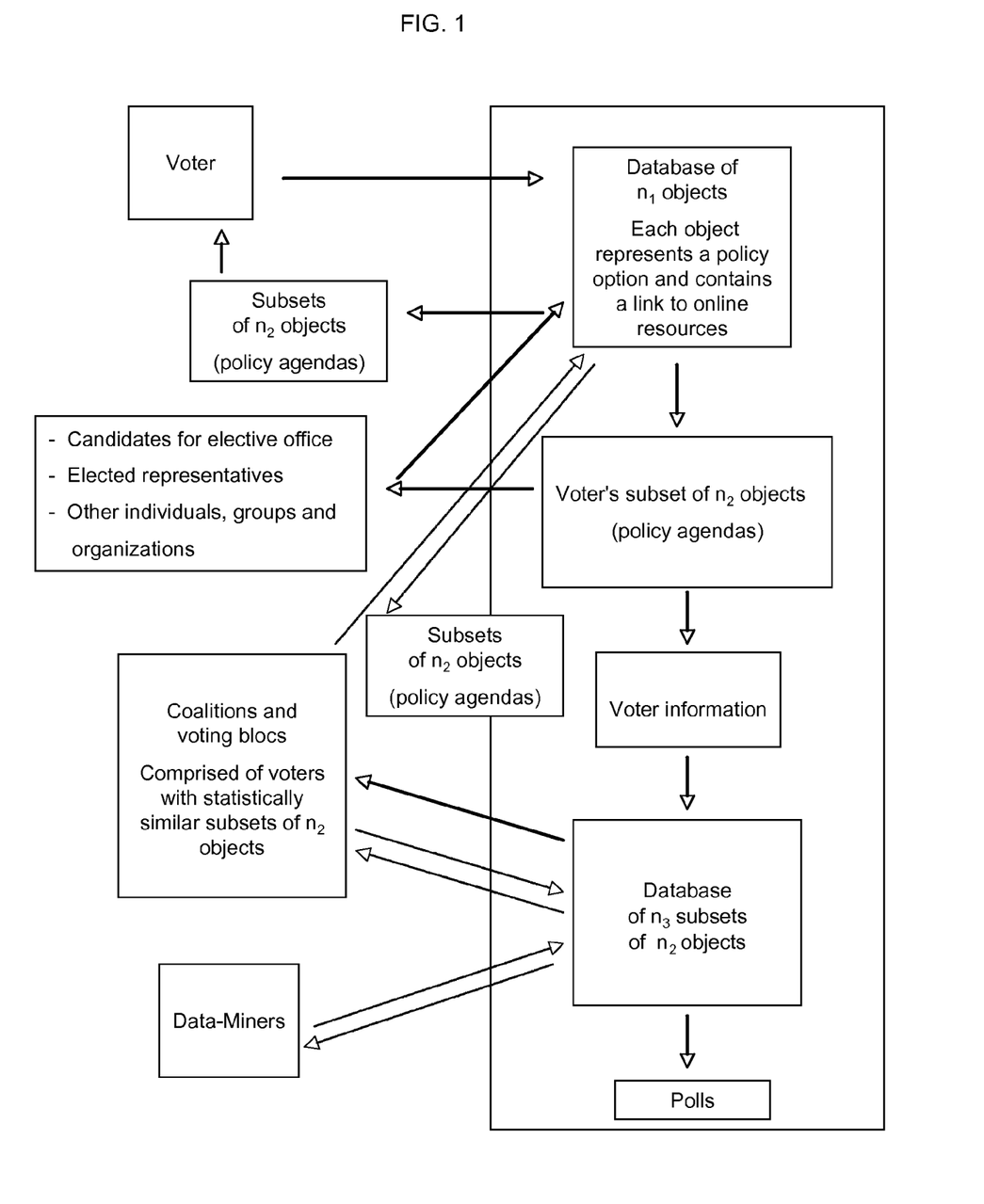
FIG. 1 is a schematic diagram of the interactive voter choice system.
Figure 2:
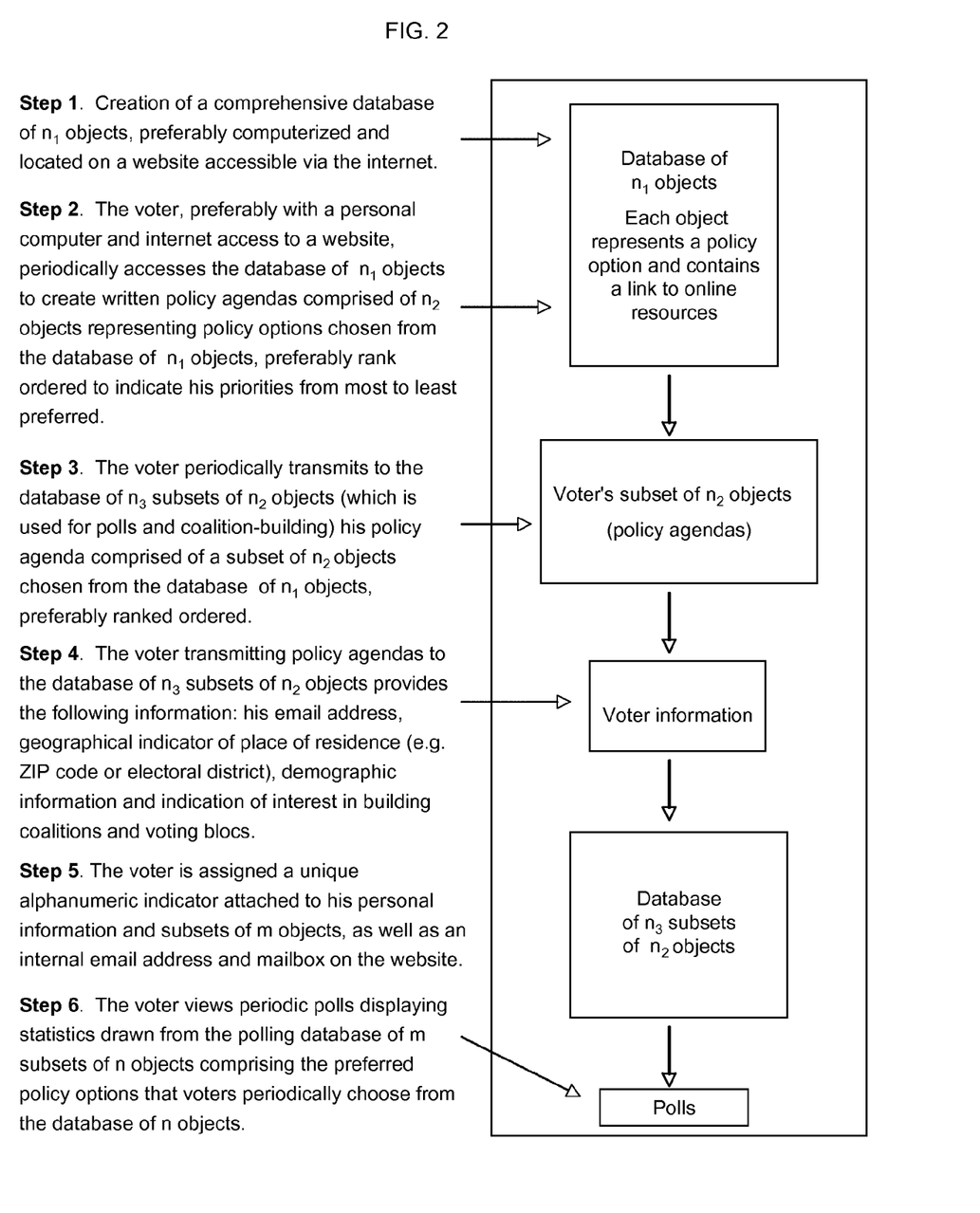
FIG. 2 is a step-by-step diagram showing how the voter utilizes the basic interactive voter choice mechanisms provided by the invention.

Per FIG. 1 and FIG. 2, voters can surmount the obstacles described above and play more pro-active roles in elections and legislative policy-making by elected representatives in representative bodies in nation-state governments, one example of a preferred embodiment, than voters typically play by using these mechanisms to:

1. Create their own written policy agendas of preferred policy options (subsets of $n_2$ objects) that they choose from a comprehensive database of $n_1$ options;
2. Transmit their agendas to candidates for office and/or elected representatives and other individuals, groups and organizations;
3. Request candidates for office, elected representatives (and other individuals, groups and organizations) to chose their preferred options from the same comprehensive database to create their own written policy agendas and transmit them to the voter;
4. Use their respective agendas to evaluate candidates who are already on the ballot and pressure them to advocate the options preferred by the voters;
5. Use their agendas to pressure elected representatives to enact the policy options preferred by the voters, as well as hold them accountable for legislative policy decisions they make that diverge from voters' policy agendas by voting against them in future elections;
6. Use their agendas and other mechanisms provided by the present invention (particularly the database of $n_3$ subsets of $n_2$ objects and methods and requirements for submitting policy agendas and options to the database) to identify and contact voters whose policy agendas and options are similar for the purpose of building consensus, coalitions and/or voting blocs that can put their own candidates on the ballot, elect them to office, oversee the formulation and enactment of their policy agendas and hold them accountable for the legislative policies they vote for or against while they are in office. (Coalitions are comprised of groups and organizations that have their own missions which may or may not include voting as a bloc, whereas a voting bloc consists of individuals, groups and organizations that come together to vote alike in order to win elections.)

In preferred embodiments, the process of making and using the invention is described in the steps below, as illustrated in the schematic diagrams provided in FIG. 1 and FIG. 2: Step 1. First, A comprehensive database of $n_1$ objects in which each object represents a policy option of concern to the voter is compiled. There should be at least two objects in the comprehensive database. There is no maximum number of objects that can be contained in the comprehensive database. For example, there could be 25 objects, 50 objects, 100 objects, 200 objects or more. The comprehensive database is maintained independently of all formal election laws, regulations, procedures and operations and accessed by voters independently of these laws, regulations, procedures and operations.

Figure 6:
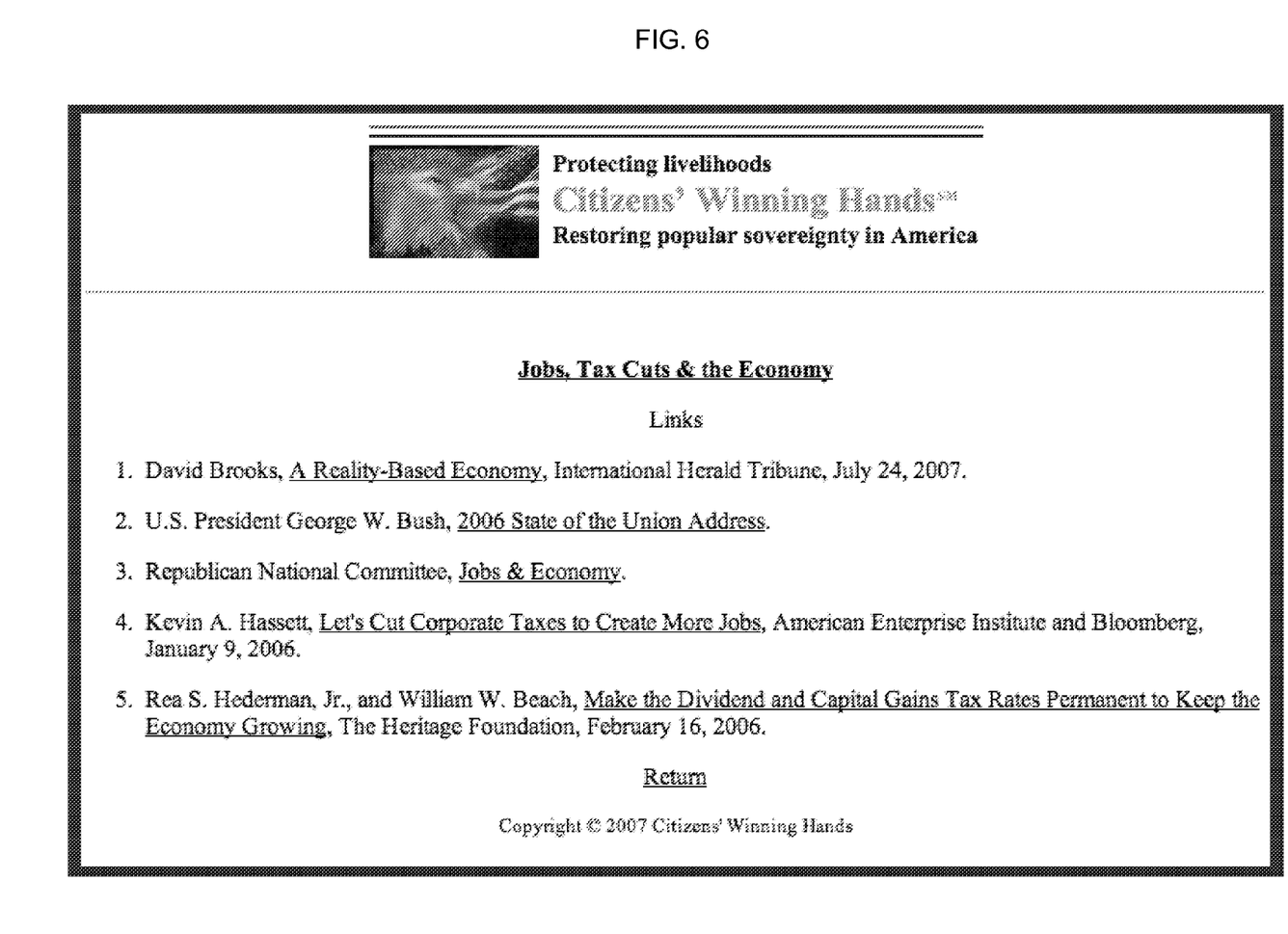
FIG. 6 provides a sample of the contents of a Uniform Resource Locator (URL) link to online information accessible via the internet found on one of the objects presented as a card in Deck 1, entitled "Jobs, Tax Cuts and the Economy" in a suit with the theme "Livelihoods".
Figure 7:
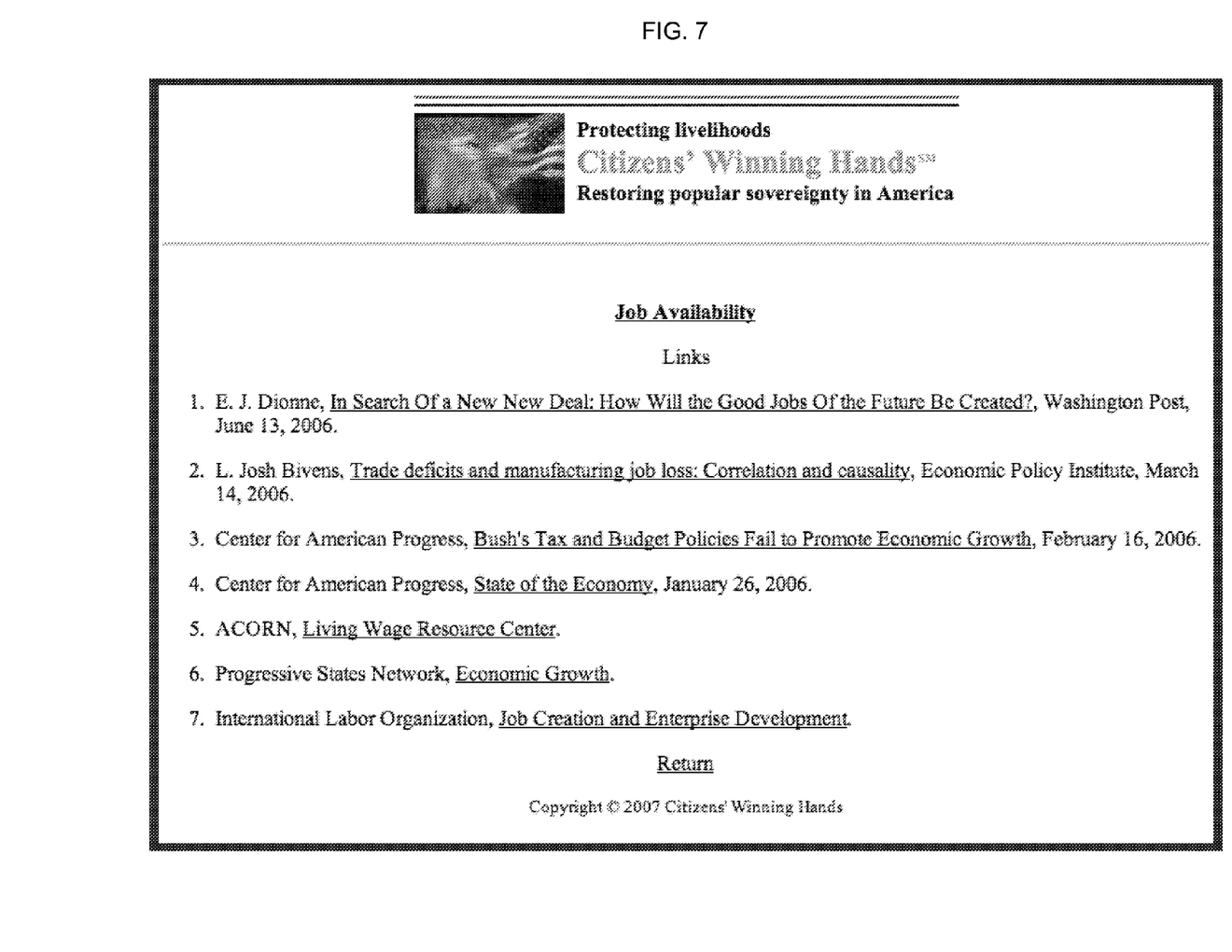
FIG. 7 provides a sample of the contents of a Uniform Resource Locator (URL) link to online information accessible via the internet found on one of the objects presented as a card in Deck 1, entitled "Job Availability" in a suit with the theme "Livelihoods".

It is preferable that:

1. The comprehensive database of $n_1$ objects contains a broad spectrum of policy options, pro and con, from which the voter and others can periodically select their preferences to create written policy agendas;
2. The comprehensive database can be computerized and searched via a personal computer;
3. The comprehensive database is accessible via a computer network and/or website on the internet;

4. New objects can be added to the comprehensive database as needed and existing objects can be modified or deleted;

5. The voter can formulate his own policy options and propose to the system administrator that they be added to the comprehensive database;

6. Per FIG. 6 and FIG. 7, each card and policy option accessible via a computer network and/or website on the internet can contain any number of computerized links, via Uniform Resource Locators (URLs), to information about each option that is accessible on other websites which the voter can access to compare, contrast and evaluate the options;

7. The system administrator can periodically update, add, modify and delete the computerized URL links to information about each policy option that is accessible on other websites;

8. The comprehensive database contains mechanisms by which the voter can rank order his preferred policy options from most to least preferred;

9. The voter who periodically chooses a new subset of $n_2$ objects from the comprehensive database of $n_1$ objects can submit each subset to a personal digital archive located on the website and/or elsewhere;

10. The voter can periodically access his personal archive and retrieve one or more selected subsets of $n_2$ objects previously stored by the voter in the archive for transmission to third parties, electronically or non-electronically.

Step 2. The voter, preferably with access to a personal computer and a computer network and/or website on the internet, periodically accesses the comprehensive database of $n_1$ objects to create policy agendas comprised of subsets of $n_2$ objects representing policy options chosen from the database of $n_1$ objects.

The entire set of objects in the comprehensive database of $n_1$ objects can be displayed electronically or non-electronically.

Figure 3:
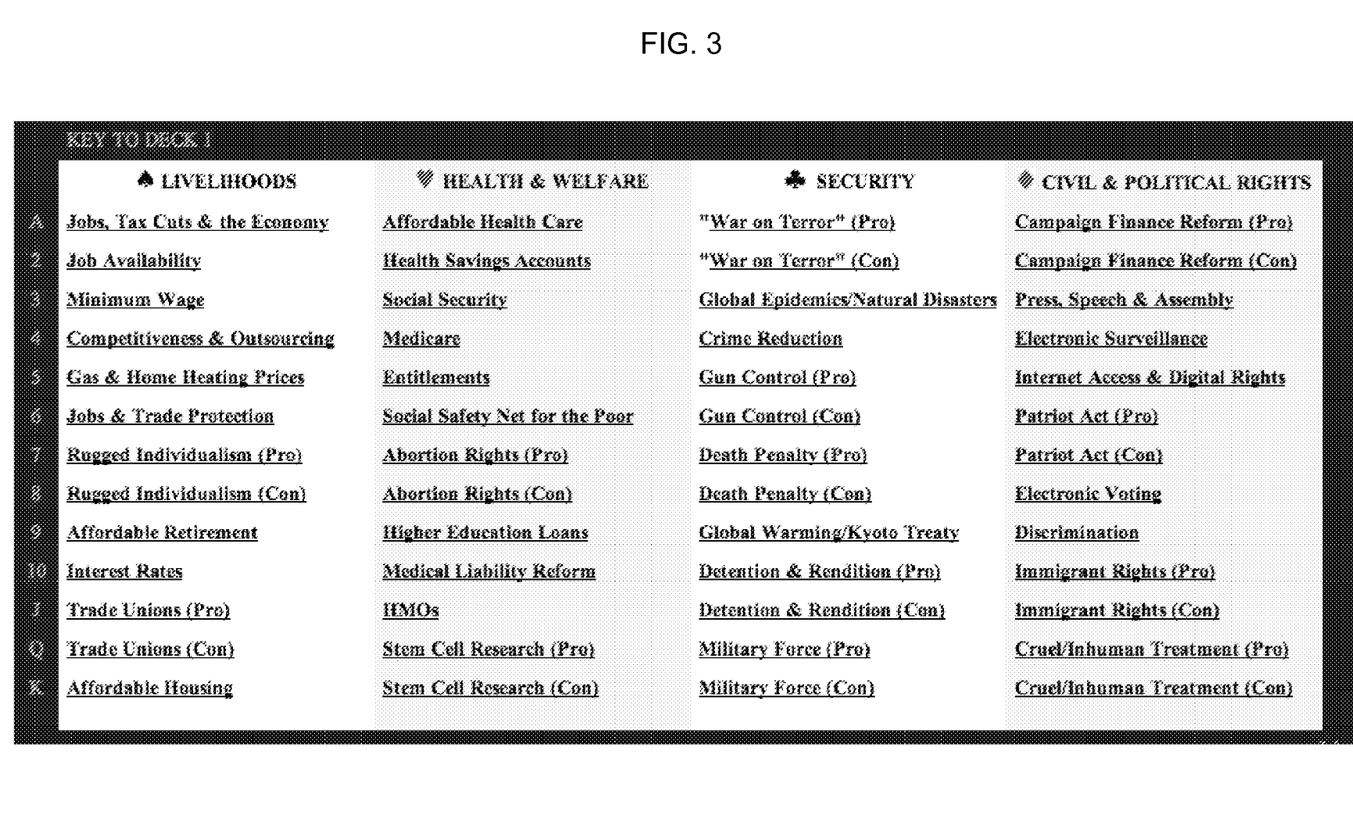
FIG. 3 Key to Deck 1. This drawing from a prototypical application of the invention to the U.S. government provides a screenshot of the names of the first 52 policy options of the 104 policy options provided in a comprehensive database of $n_1$ objects, accessible via a computer network and/or website on the internet. Per FIG. 5 below, the first 52 options are visually displayed as cards in suits contained in the first of two decks of cards in which each suit has an umbrella policy theme.
Figure 4:
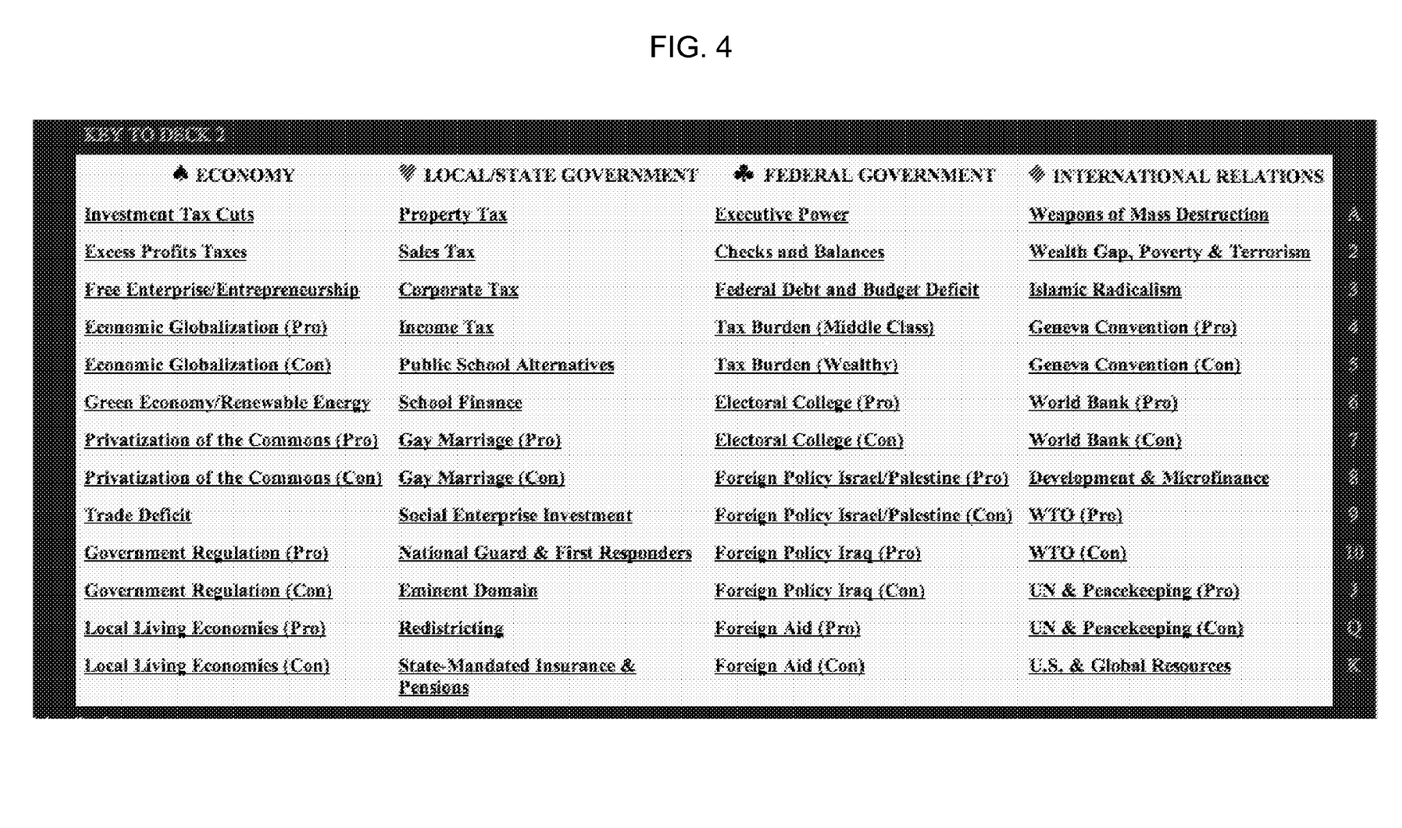
FIG. 4 Key to Deck 2. This drawing provides a screenshot of the names of the second 52 policy options of the 104 policy options provided in the comprehensive database of $n_1$ objects, per the prototype of the application of the invention to the U.S. government accessible via a computer network and/or a website on the internet. The second 52 options are visually displayed as cards in suits contained in the second of two decks of cards in which each suit has an umbrella policy theme.

Per FIG. 3 and FIG. 4, the entire set of objects can be displayed electronically and/or non electronically using visual metaphors such as decks of playing cards in which the policy options are grouped by theme under each suit to assist voters in locating options and recalling their location.

Per FIG. 5, the meaning of the individual policy options provided by each object, such as those presented in the form of cards in decks of cards, can be described in words or illustrated through images or pictures, electronically and/or non-electronically.

Step 3. Per FIG. 1 and FIG. 2, the voter periodically transmits to the database of $n_3$ subsets of $n_2$ objects (which is used for polls and coalition-building as described below) his policy agenda comprised of a subset of $n_2$ objects chosen from the comprehensive database of $n_1$ objects. It is preferable that the voter rank orders his choices of policy options to indicate his preferences from most to least preferred.

Step 4. The voter transmitting his policy agendas to the database of $n_3$ subsets of $n_2$ objects is requested to provide the following information: his email address, geographical indicator of place of residence (e.g. ZIP code or electoral district), demographic information and indication of interest in building coalitions and/or voting blocs.

Step 5. The voter is assigned a unique alphanumeric indicator attached to his personal information and the subsets of $n_2$ objects he periodically transmits to the database of $n_3$ subsets of $n_2$ objects, as well as an internal email address and mailbox on the website.

Step 6. The voter and others can view periodic polls displaying statistics compiled from the database of $n_3$ subsets of $n_2$ objects comprising the preferred policy options that voters periodically choose from the comprehensive database of $n_1$ objects.

Step 7. The voter periodically transmits his policy agendas comprised of subsets of $n_2$ objects that he has chosen from the comprehensive database of $n_1$ objects to candidates for elective office, his elected representatives and others (such as political parties, labor unions, advocacy groups, newspaper editors, etc.), electronically and/or non-electronically, to provide the candidates, representatives and others information and instructions specifying the policy options that the voter wants the candidates to advocate in their platforms and the elected representatives to vote to enact.

Step 8. The voter requests the candidates and/or representatives to access the comprehensive database of $n_1$ objects to create written policy agendas of policy options chosen from the comprehensive database, preferably rank ordered.

Step 9. The voter evaluates, compares and contrasts their respective policy agendas and advocates enactment of policy options on which they agree, as well as those advocated solely by the voter. The voter utilizes his evaluations of the policy agendas of the candidates and the agendas and legislative enactments of his elected representatives in deciding which candidates to vote for in the next election.

Step 10. The voter uses his policy agendas to build consensus and develop collaborative activities with individuals, groups and organizations for the purpose of collectively advocating the legislative enactment of preferred policy options by transmitting his policy agendas and his comments to individuals, groups and organizations, by electronic or non-electronic means;

Step 11. The voter requests the individuals, groups and organizations to access the comprehensive database of $n_1$ objects to choose their preferred policy options from the database and transmit their policy agendas to the voter, preferably rank ordering their preferences to indicate their priorities from most to least preferred;

Step 12. The voter collaborates with the individuals, groups and organizations to compare and contrast their respective policy agendas, identify shared policy options and develop consensus regarding collective advocacy of their agendas and specific policy options for legislative enactment.

Step 13. The voter can build coalitions and/or voting blocs that enable him to play a more pro-active role in elections and legislative policy-making by elected representatives than voters typically play. He can use mechanisms provided by the invention to identify the number of voters (and their geographical location) whose policy agendas and preferred policy options chosen from the comprehensive database of $n_1$ objects are similar to those he has transmitted to the database of $n_3$ subsets of $n_2$ objects.

Step 15. These mechanisms authorize each voter who has received a unique alphanumeric indicator, as described in Steps 4 and 5 above, to query the database of $n_3$ subsets of $n_2$ objects, via the system administrator of the computer network or website, to identify the number of voters, their place of residence and other available demographic information related to these voters, whose preferred policy options are similar to the voter's own preferences contained in the subsets of $n_2$ objects that the voter has submitted to the database of $n_3$ subsets of $n_2$ objects.

Step 16. The results are transmitted to the voter through his internal email address and mailbox located on the website.

Step 17. The voter who is authorized to query the database requesting the number of voters who have chosen similar policy options and live in his vicinity is also authorized to request the system administrator of the computer network and/or website to send an email to each of these individuals (whose alphanumeric identifier and internal email address are known to the system administrator) with a short message and a request that the individual contact the voter using his alphanumeric identifier and internal email address and mailbox, and/or another address provided by the voter.

The voter who is contacted by voters with similar policy agendas and preferred policy options can collaborate online and offline with these individuals to create coalitions and/or voting blocs using tools and services provided by the computer network and/or website through which they have created their policy agendas, or independently of it.

Step 18. Voters can use their coalitions and/or voting blocs to transmit their policy agendas and comments to candidates and/or elected representatives to provide them information, instructions and guidance regarding the policy options they want the candidates and/or representatives to enact.

Step. 19. Voters and their coalitions and/or voting blocs can request candidates and elected representatives to access the comprehensive database of $n_1$ objects and choose their preferred policy options from the database, preferably rank ordering their policy options, and transmit their policy agendas to the coalitions and/or voting blocs.

Step. 20. Coalitions and/or voting blocs can evaluate, compare and contrast their own policy agendas with those of the candidates and representatives and advocate enactment of the policies and priorities they agree upon, as well as policy options solely supported by the coalitions and/or blocs.

They can evaluate their candidates' and elected representatives' policy agendas, including the actions and enactments of the representatives, to decide whether to vote for or against them in forthcoming elections.

Step 21. Coalitions and/or voting blocs who are dissatisfied with the track records of incumbent elected representatives standing for re-election, and/or the platforms of non-incumbent candidates running for office, can decide to run their own candidates on platforms that more closely resemble their own policy agendas.

These coalitions and/or voting blocs can use mechanisms provided by the invention to broaden their base of support in order to ensure that they have enough votes to elect their candidates in primary and general elections. They can access the database of $n_3$ subsets of $n_2$ objects to identify, contact and solicit the votes of voters in their vicinity who have submitted policy agendas and policy options to this database that are similar to their own.

After coalitions and/or voting blocs have elected their own candidates to representative office, they can periodically access the comprehensive database to update their policy agendas in collaboration with their elected representatives in order to identify the shared policy priorities they want enacted and monitor the track record of the representatives in enacting them.

What is claimed is:

1. A system to create aggregates of voters with similar preferred policy options to influence elections and policy-making in representative bodies, comprising:
    a plurality of user terminals operated by voters;
    a communications network, wherein the network comprises at least one of the Internet and a website on the Internet;
    a computerized database of $n_1$ objects located in a storage device on the network, each object representing a stance on a policy option of concern to voters;
    said user terminals are configured to periodically access the website, select any number of policy options from the computerized database of $n_1$ objects, and create policy agendas comprised of subsets of $n_2$ objects to represent voters' preferred policy options;
    said user terminals are configured to transmit via the website to a computerized database of $n_3$ subsets of $n_2$ objects located in the storage device on the network the preferred policy options contained in the voters' subsets of $n_2$ objects;
    said user terminals are configured to periodically query via the website the computerized database of $n_3$ subsets of $n_2$ objects and identify voters who have chosen policy options that are statistically similar to the querying voters' chosen policy options contained in their subsets of $n_2$ objects submitted to the database of $n_3$ subsets of $n_2$ objects;
    said computerized database of $n_3$ subsets of $n_2$ objects is configured to transmit to user terminals of querying voters a list responsive to the query;
    said user terminals are configured to query the database of $n_3$ subsets of $n_2$ objects, identify voters who have chosen policy options statistically similar to the querying voters' chosen policy options are configured to contact the user terminals of voters with similar policy options, and create aggregates of voters with similar policy options to act collectively to influence elections and policy-making in representative bodies;
    said user terminals operated by voters and others are configured to periodically query the computerized database of $n_3$ subsets of $n_2$ objects located in the storage device on the network to obtain and display on user terminals information regarding the preferred policy options of voters who have submitted their chosen options to the database, and changes, patterns and trends in preferences that correlate with geographical location and other factors.

2. The system of claim 1, wherein the database of $n_3$ subsets of $n_2$ objects is further configured to display on user terminals reports, statistics and poll results compiled from the database of $n_1$ objects and the database of $n_3$ subsets of $n_2$ objects located in the storage device on the network.

3. The system of claim 1, wherein the database of $n_3$ subsets of $n_2$ objects further configured to rank order voters' preferred policy options chosen from the database of $n_1$ objects located in the storage device on the network, from most to least preferred, and transmit to said user terminals a list of voters' rank ordered policy options.

4. The system of claim 1, wherein user terminals operated by voters are further configured to provide tools and services accessible on the website on the network to organize and build consensus within aggregates of voters by creating individual email addresses and individual web pages on the website and voting on proposals to create policy agendas of preferred policy options and act collectively to influence elections and policy-making in representative bodies.

5. The system of claim 1, wherein the comprehensive database of $n_1$ objects is further configured to modify objects in the database located in the storage device on the network, add objects to the database, and delete objects from the database.

6. The system of claim 1, wherein the comprehensive database of $n_1$ objects is further configured to display on user terminals operated by voters the objects contained in the database using digital media, and auditory, visual and textual metaphors.

7. The system of claim 1, wherein each object in the computerized database of $n_1$ objects located in the storage device on the network contains any number of computerized links, via Uniform Resource Locators (URLs), to information about each object, said system being further configured to periodically modify, increase and delete said computerized links.

8. The system of claim 1, wherein the computerized database of $n_1$ objects is further configured to periodically store in individual personal digital archives located in the storage device on the network the subset and/or subsets of $n_2$ objects selected from the database by user terminals operated by voters, said archives further configured for user terminals to periodically retrieve subsets of $n_2$ objects from the archives.

9. The system of claim 1, wherein the computerized database of $n_1$ objects is further configured to transmit voters' preferred policy options to user terminals of candidates and elected representatives, with or without comments, to provide information and instructions regarding the policy options voters want candidates and representatives to enact; and request that candidates and representatives access the computerized database of $n_1$ objects, choose their preferred policy options from the database and transmit their policy agendas to the voters' terminals for evaluation, with or without rank ordering their preferred options.

10. The system of claim 1, wherein the database of $n_1$ objects is further configured to transmit the preferred policy options of individual voters and aggregates of voters, with or without comments, to user terminals of individuals, groups and organizations; request individuals, groups and organizations to access the database of $n_1$ objects to choose their preferred policy options, transmit their preferred options to the computerized database of $n_3$ subsets of $n_2$ objects, and query the database to identify the policy options preferred by the individuals, groups and organizations and build consensus by voting on proposals to form voting blocs and electoral coalitions around preferred policy preferences to act collectively to influence elections and policy-making in representative bodies.

11. The system of claim 1, wherein the computerized database of $n_3$ subsets of $n_2$ objects is further configured to provide user terminals of aggregates of voters with similar preferred policy options tools and services accessible on the website to build consensus on acting collectively to influence elections by voting on whether to support or oppose candidates seeking elective office.

12. The system of claim 1, wherein the computerized database of $n_3$ subsets of $n_2$ objects is further configured to provide user terminals of aggregates of voters with similar preferred policy options tools and services accessible on the website to build consensus on acting collectively to influence elections by voting on proposals to place electoral candidates on the ballot.

* * * * *